United States Patent
Lohr (10) Patent No.: US 10,400,872 B2
(45) Date of Patent: Sep. 3, 2019

(54) BALANCED SPLIT SUN ASSEMBLIES WITH INTEGRATED DIFFERENTIAL MECHANISMS, AND VARIATORS AND DRIVE TRAINS INCLUDING BALANCED SPLIT SUN ASSEMBLIES

(71) Applicant: Fallbrook Intellectual Property Company LLC, Cedar Park, TX (US)

(72) Inventor: Charles B. Lohr, Austin, TX (US)

(73) Assignee: Fallbrook Intellectual Property Company LLC, Cedar Park, TX (US)

(*) Notice: Subject to any disclaimer, the term of this patent is extended or adjusted under 35 U.S.C. 154(b) by 515 days.

(21) Appl. No.: 14/928,938

(22) Filed: Oct. 30, 2015

(65) Prior Publication Data

US 2016/0290451 A1   Oct. 6, 2016

Related U.S. Application Data (60) Provisional application No. 62/141,105, filed on Mar. 31, 2015.

(51) Int. Cl.
| | | |
|---|---|---|
| F16H 15/52 | (2006.01) | |
| F16H 37/02 | (2006.01) | |
| F16H 37/08 | (2006.01) | |
| F16H 15/28 | (2006.01) | |

(52) U.S. Cl.
CPC ........... F16H 15/52 (2013.01); F16H 37/022 (2013.01); F16H 37/086 (2013.01); *F16H 15/28* (2013.01)

(58) Field of Classification Search
CPC ...... F16H 15/52; F16H 15/503; F16H 37/086; F16H 37/022
See application file for complete search history.

(56) References Cited

U.S. PATENT DOCUMENTS

| | | | |
|---|---|---|---|
| 2,131,158 | A | 9/1938 | Almen et al. |
| 2,553,465 | A | 5/1951 | Monge |
| 2,595,367 | A | 5/1952 | Picanol |
| 3,035,460 | A | 5/1962 | Guichard |
| 3,229,538 | A | 1/1966 | Schlottler |
| 3,237,468 | A | 3/1966 | Schlottler |

(Continued)

FOREIGN PATENT DOCUMENTS

| | | |
|---|---|---|
| CN | 1178573 | 4/1998 |
| CN | 1178751 | 4/1998 |

(Continued)

OTHER PUBLICATIONS

International Search Report and Written Opinion dated Sep. 16, 2016 in PCT/US16/022904.

*Primary Examiner* — Erin D Bishop
(74) *Attorney, Agent, or Firm* — Knobbe Martens Olson & Bear LLP (57) ABSTRACT

A balanced split sun assembly with an integrated differential mechanism allows power to be transferred from a sun assembly to a plurality of ball planets, or allows power to be transferred from a plurality of ball planets to a sun assembly, while minimizing sliding, spin, axial pull, or other unwanted effects on the sun assembly. A differential mechanism, including offset mechanisms, allows torque to be divided between multiple split sun rolling elements. Variations in design of a split sun assembly allow for ease of manufacture, ease of assembly, and ease of adjustment.

8 Claims, 7 Drawing Sheets

(56) References Cited

U.S. PATENT DOCUMENTS

| | | |
|---|---|---|
| 3,280,646 A | 10/1966 | Lemieux |
| 3,283,614 A | 11/1966 | Hewko |
| 3,430,504 A | 3/1969 | Dickenbrock |
| 3,581,587 A | 6/1971 | Dickenbrock |
| 4,023,442 A | 5/1977 | Woods et al. |
| 4,515,040 A | 5/1985 | Takeuchi et al. |
| 4,569,670 A | 2/1986 | McIntosh |
| 5,083,982 A | 1/1992 | Sato |
| 5,895,337 A | 4/1999 | Fellows et al. |
| 5,976,054 A | 11/1999 | Yasuoka |
| 6,003,649 A | 12/1999 | Fischer |
| 6,012,538 A | 1/2000 | Sonobe et al. |
| 6,074,320 A | 6/2000 | Miyata et al. |
| 6,083,139 A | 7/2000 | Deguchi |
| 6,101,895 A | 8/2000 | Yamane |
| 6,210,297 B1 | 4/2001 | Knight |
| 6,217,478 B1 | 4/2001 | Vohmann et al. |
| 6,296,593 B1 | 10/2001 | Gotou |
| 6,367,833 B1 | 4/2002 | Horiuchi |
| 6,371,878 B1 | 4/2002 | Bowen |
| 6,459,978 B2 | 10/2002 | Tamiguchi et al. |
| 6,558,285 B1 | 5/2003 | Sieber |
| 6,723,014 B2 | 4/2004 | Shinso et al. |
| 6,868,949 B2 | 3/2005 | Braford |
| 7,063,195 B2 | 6/2006 | Berhan |
| 7,383,748 B2 | 6/2008 | Rankin |
| 7,383,749 B2 | 6/2008 | Rankin |
| 7,909,723 B2 | 3/2011 | Triller et al. |
| 7,959,533 B2 | 6/2011 | Nichols et al. |
| 8,313,405 B2 | 11/2012 | Bazyn et al. |
| 8,360,917 B2 | 1/2013 | Nichols et al. |
| 8,512,195 B2 | 8/2013 | Lohr et al. |
| 8,517,888 B1 | 8/2013 | Brookins |
| 8,608,609 B2 | 12/2013 | Sherrill |
| 8,827,856 B1 | 9/2014 | Younggren et al. |
| 8,827,864 B2 | 9/2014 | Durack |
| 8,888,643 B2 | 11/2014 | Lohr et al. |
| 8,924,111 B2 | 12/2014 | Fuller |
| 8,961,363 B2 | 2/2015 | Shiina et al. |
| 8,992,376 B2 | 3/2015 | Ogawa et al. |
| 9,052,000 B2 * | 6/2015 | Cooper ................ F16H 15/52 |
| 9,291,251 B2 | 3/2016 | Lohr et al. |
| 9,360,089 B2 | 6/2016 | Lohr et al. |
| 9,528,561 B2 | 12/2016 | Nichols et al. |
| 9,656,672 B2 | 5/2017 | Schieffelin |
| 9,878,719 B2 | 1/2018 | Carter et al. |
| 2001/0023217 A1 | 9/2001 | Miyagawa et al. |
| 2001/0044358 A1 | 11/2001 | Taniguchi |
| 2002/0049113 A1 | 4/2002 | Watanabe et al. |
| 2002/0117860 A1 | 8/2002 | Man et al. |
| 2002/0161503 A1 | 10/2002 | Joe et al. |
| 2002/0179348 A1 | 12/2002 | Tamai et al. |
| 2003/0144105 A1 | 7/2003 | O'Hora |
| 2005/0064986 A1 | 3/2005 | Ginglas |
| 2005/0181905 A1 | 8/2005 | Ali et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0054422 A1 | 3/2006 | Dimsey et al. |
| 2006/0234826 A1 | 10/2006 | Moehlmann et al. |
| 2007/0155552 A1 | 7/2007 | De Cloe |
| 2008/0009389 A1 | 1/2008 | Jacobs |
| 2008/0183358 A1 | 7/2008 | Thomson et al. |
| 2010/0145573 A1 | 6/2010 | Vasilescu |
| 2010/0181130 A1 | 7/2010 | Chou |
| 2011/0237385 A1 | 9/2011 | Andre Parise |
| 2012/0035011 A1 | 2/2012 | Menachem et al. |
| 2012/0115667 A1 * | 5/2012 | Lohr ................ F16H 15/50 475/214 |
| 2014/0094339 A1 | 4/2014 | Ogawa et al. |
| 2014/0274536 A1 | 9/2014 | Versteyhe |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0031526 A1 | 2/2016 | Watarai |
| 2016/0040763 A1 | 2/2016 | Nichols et al. |
| 2016/0061301 A1 | 3/2016 | Bazyn et al. |
| 2016/0131231 A1 | 5/2016 | Carter et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0298740 A1 | 10/2016 | Carter et al. |
| 2016/0347411 A1 | 12/2016 | Yamamoto et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 1412033 | 4/2003 |
| CN | 1434229 | 8/2003 |
| CN | 1483235 | 3/2004 |
| CN | 1568407 | 1/2005 |
| CN | 1736791 | 2/2006 |
| CN | 1847702 | 10/2006 |
| CN | 101016076 | 8/2007 |
| DE | 2021027 | 12/1970 |
| DE | 102011016672 | 10/2012 |
| DE | 102012023551 | 6/2014 |
| DE | 102014007271 | 12/2014 |
| EP | 1 251 294 | 10/2002 |
| EP | 2 893 219 | 7/2015 |
| GB | 2035481 | 6/1980 |
| JP | 49-012742 | 3/1974 |
| JP | 56-24251 | 3/1981 |
| JP | 56-101448 | 8/1981 |
| JP | 63-125854 | 5/1988 |
| JP | 08-135748 | 5/1996 |
| JP | 10-078094 | 3/1998 |
| JP | 10-225053 | 8/1998 |
| JP | 11-210850 | 8/1999 |
| JP | 11-240481 | 9/1999 |
| JP | 2000-6877 | 1/2000 |
| JP | 2001-234999 | 8/2001 |
| JP | 2001-328466 | 11/2001 |
| JP | 2003-320987 | 11/2003 |
| JP | 2004-38722 | 2/2004 |
| JP | 2004-301251 | 10/2004 |
| JP | 2005-096537 | 4/2005 |
| JP | 2005-188694 | 7/2005 |
| JP | 2007-085404 | 4/2007 |
| JP | 2007-321931 | 12/2007 |
| JP | 2008-133896 | 6/2008 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| TW | 401496 | 8/2000 |
| TW | 510867 | 11/2002 |
| TW | 200821218 | 5/2008 |
| WO | WO 99/08024 | 2/1999 |
| WO | WO 11/064572 | 6/2011 |
| WO | WO 11/121743 | 10/2011 |
| WO | WO 13/042226 | 3/2013 |

(56) References Cited

FOREIGN PATENT DOCUMENTS

| WO | WO 13/112408 | 8/2013 |
| WO | WO 14/186732 | 11/2014 |
| WO | WO 16/062461 | 4/2016 |

* cited by examiner

BALANCED SPLIT SUN ASSEMBLIES WITH INTEGRATED DIFFERENTIAL MECHANISMS, AND VARIATORS AND DRIVE TRAINS INCLUDING BALANCED SPLIT SUN ASSEMBLIES

RELATED APPLICATIONS

This application claims the benefit of U.S. Provisional Patent Application Ser. No. 62/141,105 filed Mar. 31, 2015, and this application is related to U.S. patent application Ser. No. 13/288,711, filed Nov. 3, 2011 and now issued as U.S. Pat. No. 8,888,643, and to U.S. patent application Ser. No. 14/541,875, filed Nov. 14, 2014 and published as U.S. Patent Publication No. 2015/0072827, each of which is incorporated by reference.

FIELD OF THE DISCLOSURE

Embodiments disclosed herein may be directed to a split sun assembly for use in ball planetary variators. In particular, embodiments may be directed to split sun assemblies with torque differential mechanisms and axial load balancing mechanisms for sharing torque between multiple rolling elements and reducing sliding, spin, axial pull, or other unwanted effects in variators.

BACKGROUND

Conventionally, the gear ratio of a gear train, also known as its speed ratio, is the ratio of the angular velocity of the input gear to the angular velocity of the output gear. When using traditional (i.e., geared) transmissions, the gear ratio can be calculated directly from the numbers of teeth on the gears in the gear train. The torque ratio of the gear train, also known as its mechanical advantage, is determined by the gear ratio. The speed ratio and mechanical advantage are defined so they yield the same number in an ideal linkage. For a given transmission, the highest torque ratio or highest torque leverage occurs at the highest speed ratio.

Ball planet-planetary continuously variable transmissions (CVT) generally utilize a plurality of spherical rolling elements (also commonly referred to as ball planets, planets, or spheres) interposed between an input ring and an output ring, and in contact with a sun, to provide a continuous range of speed ratios. Ball planet-planetary CVTs may also be referred to as variators.

In some ball planet-planetary variators, the sun has two rolling elements, each in contact with the ball planets. It should be noted that contact between the two sun rolling elements and the ball planets may be direct contact, or there may be an intermediary fluid between the two sun rolling elements and corresponding points on the ball planets, which is commonly referred to as a traction fluid or friction fluid. Regardless of whether the contact is direct contact or there is an intermediary fluid, when a ball planet tilt angle is other than zero in a ball planetary variator and there are two sun rolling elements positioned with axial separation, the two sun rolling elements commonly rotate at different speeds. In other words, the surface speed of the ball planet at the contact position between the ball planet and the first sun rolling element is different than the surface speed of the ball planet at the contact position between the ball planet and the second sun rolling element. When both sun rolling elements are forced to rotate at the same speed, there exists sliding between the contacts. Sliding may limit the capacity for transferring power from the sun to the ball planets, affecting the power capacity or the efficiency of the variator. Sliding may also cause excessive noise, heat, vibration, abrasion or other negative effects, reducing the life of the variator.

SUMMARY

In one broad respect, embodiments disclosed herein may be directed to a sun having a torque balancing differential mechanism between two sun rolling elements. A torque balancing differential mechanism assembly is located in the power path between the external power source (or load) and each of the two sun rolling elements or between the two sun rolling elements. Equal torque may be applied to each of the sun rolling elements but the sun rolling elements may rotate at different speeds. Thus, torque passing through both sun rolling elements may be balanced, and the arrangement avoids sliding due to unbalanced surface speeds. The differential mechanism assembly may be proximate to the sun assembly or offset from the sun assembly. In one embodiment, a thrust bearing that prevents separation of the two sun rolling elements is used as the differential mechanism assembly. In that embodiment, power may be transmitted to or from the sun rolling elements through the bearing rolling element.

In another broad respect, embodiments disclosed herein may be directed to a variator having a sun, a plurality of ball planets, and first and second rings. The plurality of ball planets may be interposed between the first and second rings, and further in contact with and rotatable about the sun. The sun may have a torque balancing differential mechanism interposed between two sun rolling elements. When power enters the variator through the sun, the torque balancing differential mechanism ensures power is transferred to the ball planets with little or no sliding. Efficient transfer of power from the sun's rolling elements to the plurality of ball planets reduces the heat buildup in the variator and increases the efficiency of the variator. Efficient transfer of power from the sun to the plurality of ball planets reduces abrasive effects and may increase the life, the power capacity, or the efficiency of the variator.

In another broad respect, embodiments disclosed herein may be directed to a drive train including a continuously variable transmission for receiving power from an engine, motor, human power or some other power source. Power may enter the CVT through a shaft or other element and pass through a sun having a torque balancing differential mechanism between two sun rolling elements. The CVT may include a variator having a sun, a plurality of ball planets, and first and second rings. The plurality of ball planets may be interposed between the first and second rings, and further in contact with and rotatable about the sun. The sun may have a torque balancing differential mechanism interposed between two sun rolling elements. The CVT may be coupled to a power source in various ways, including via a shaft coupled to the sun. When power enters the variator through the sun, the torque balancing differential mechanism ensures power is transferred to the ball planets with substantially no slide. Efficient transfer of power from the sun to the plurality of ball planets reduces the heat buildup in the variator and increases the efficiency of the CVT. Efficient transfer of power from the sun to the plurality of ball planets may reduce abrasive effects and may increase the life, power capacity or efficiency of the CVT, extend the effectiveness of the traction fluid, etc.

Each sun rolling element may be formed from various subelements. Manufacturing subelements may result in reduced costs and preferred manufacturing methods, and may further enable better tolerances or preferred configurations for improved power capacity, efficiency or other parameters.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

A better understanding of an exemplary embodiment will be obtained from a reading of the following detailed description and the accompanying drawings wherein identical reference characters refer to similar or identical parts and in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components and equipment are omitted so as not to unnecessarily obscure the features and advantages they provide. It should be understood, however, that the detailed description and the specific examples, while indicating preferred embodiments, are given by way of illustration only and not by way of limitation. Various substitutions, modifications, additions and/or rearrangements within the spirit and/or scope of the underlying concepts will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Furthermore, unless expressly stated to the contrary, the use of the term "or" refers to an inclusive "or" and not to an exclusive or logical "or." For example, a condition "A or B" is satisfied by any one of the following: A is true (or present) and B is false (or not present), A is false (or not present) and B is true (or present), or both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

As used herein, the term "tangential force" refers to a force tangential to a traction surface and normal to a line radial to the axis of the body having an applied torque. The term "transmitted force" may be used interchangeably with the term "tangential force."

In an effort to provide context and better illustrate the features and advantages disclosed herein, one example of a variator is described.

Figure 1:
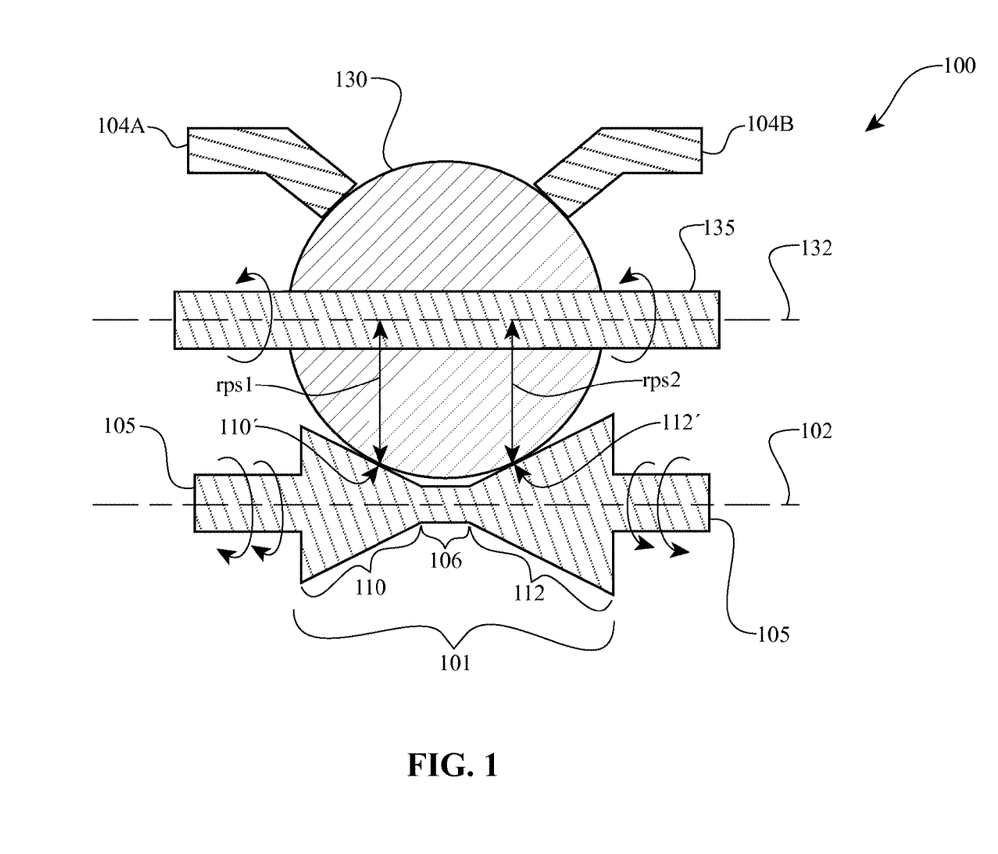
FIG. 1 depicts a view of one embodiment of a split sun assembly.

As depicted in FIG. 1, variator 100 has a plurality of ball planets 130 located angularly around and in contact with central axle 105 defining longitudinal axis 102, and further in contact with rings 104A, 104B and sun assembly 101. Power may pass through variator 100 in via various paths: from first ring 104A through ball planets 130 to second ring 104B (with sun assembly 101 acting as an idler); from first ring 104A or second ring 104B through ball planets 130 to sun assembly 101); or from sun assembly 101 through ball planets 130 to first ring 104A or second ring 104B. Combinations of power paths are also possible. For example, power may enter via sun assembly 101 through ball planets 130 and a portion passes to first ring 104A and a second portion passes to second ring 104B.

FIG. 1 depicts variator 100 with sun assembly 101 formed with multiple sun rolling elements 110, 112 joined by rigid coupling 106. An advantage to having multiple sun rolling elements may be the reduced Hertzian stresses applied to sun assembly 101. As depicted in FIG. 1, first sun rolling element 110 and second sun rolling element 112 contact ball planet 130 (of a plurality of ball planets 130), such that power from central axle 105 is applied to ball planet 130 via first sun rolling element 110 and second sun rolling element 112 or power applied to ball planets 130 may be transferred to central axle 105 via first sun rolling element 110 and second sun rolling element 112. Ball planets 130 contact first sun rolling element 110 at point 110' and contact second sun rolling element 112 at point 112'. Ball planet 130 is configured to rotate about ball planet axle 135 defining ball planet axis 132. First rolling radius rps1 is defined as the shortest distance between ball planet axis 132 and contact point 110' (i.e., the interface between ball planet 130 and first sun rolling element 110). Second rolling radius rps2 is defined as the shortest distance between ball planet axis 132 and contact point 112' (i.e., the interface between ball planet 130 and second sun rolling element 112). It should be noted that rps1 and rps2 change as ball planet axle 135 (and hence ball planet axis 132) tilts.

Ball planet 130 ideally functions as a uniform body, such that any torque applied to ball planet 130 does not twist or deform ball planet 130 and ball planet 130 is able to transfer power with substantially zero internal losses. Ideally, when ball planet axle 135 is parallel with central axle 105 (and therefore ball planet axis 132 is parallel to longitudinal axis 102 such that rps1=rps2) and each ball planet 130 is rotated about its ball planet axis 132 as the plurality of ball planets 130 rotate about longitudinal axis 102, the following conditions are met:
  a) the surface speed at point 110' of ball planet 130 is equal to the surface speed at point 112' of ball planet 130;
  b) the torque at point 110' of ball planet 130 is equal to the torque at point 112' of ball planet 130;
  c) the surface speed at point 110' of first sun rolling element 110 is equal to the surface speed at point 112' of second sun rolling element 112; and
  d) the torque at point 110' of ball planet 130 is equal to the torque at point 112' of ball planet 130.

However, when a variator or continuously variable transmission is in either high ratio or low ratio, radius rps1 may differ from radius rps2 and the ball planets 130 will have a different surface speed at radius rps1 than the surface speed at radius rps2. When this occurs, if first sun rolling element 110 is constrained relative to second sun rolling element 112, one of the following conditions occurs:
  e) the torque applied to first sun rolling element 110 will be greater than or less than the torque applied to second sun rolling element 112; or
  f) the surface speed at point 110' of ball planet 130 will be greater than or less than the surface speed at point 112' of ball planet 130.

If either condition is present, sliding or other unwanted effects may be forced at one or both contact points 110' or 112'. This scenario is commonly seen in dual contact suns such as "v-notch" suns, in which the two elements are rigidly coupled (e.g., using rigid coupling 106) such that rotation of first sun rolling element 110 relative to second sun rolling element 112 is always 1:1. For small variations, the properties of a traction fluid may compensate with minimal losses and reduced negative effects. However, as the tilt angle or the rotational speed or torque is increased, the traction fluid becomes less effective in preventing sliding or protecting components in a variator. Heat generated by sliding may reduce a traction fluid's ability to transfer power, thereby reducing the efficiency of traction contacts between a sun and any ball planets. Sliding may also generate noise, vibration, or damage to a sun or ball planets. The traction fluid may be damaged. Other components may also be affected by the products of sliding.

Embodiments disclosed herein may overcome these and other shortcomings of the prior art. A split sun assembly including a torque sharing differential mechanism may transfer power from two sun rolling elements to ball planets through application of equal tangential forces while allowing difference in speeds with no forced sliding. Furthermore, in CVTs using embodiments of a split sun assembly disclosed herein, rolling elements in a split sun assembly are not rigidly coupled, but instead are variably coupled to each other, such as by a bearing or a differential mechanism to allow relative rotation as needed to prevent sliding or otherwise increase power capacity or efficiency of the CVT.

Figure 2A:
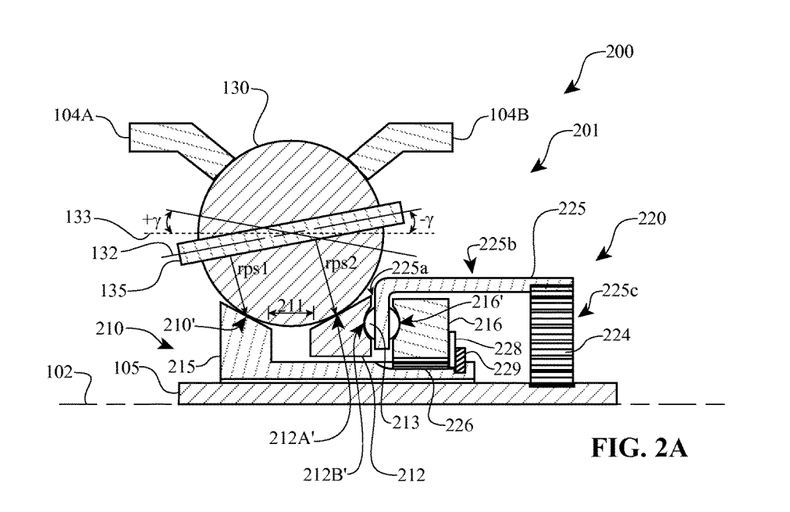
FIG. 2A depicts a close-up partial view of one embodiment of a variator including a split sun assembly and a differential mechanism.

FIG. 2A depicts a cross sectional partial view of a variator, illustrating one embodiment of a differential mechanism and a split sun assembly for balanced contact with a plurality of ball planets. Variator 200 includes ball planets 130 angularly arranged about central axle 105 and in contact with traction rings 104A, 104B and split sun assembly 201. Split sun assembly 201 includes first sun rolling element 210 and second sun rolling element 212. First sun rolling element 210 or second sun rolling element 212 may be formed from multiple parts. For example, as depicted in FIG. 2A, first sun rolling element 210 may be formed collectively from a first subelement 215 of first sun rolling element 210 and a second subelement 216 of first sun rolling subelement 210. In some embodiments, the first and second subelements 215 and 216 of first sun rolling element 210 may be formed separately and coupled to form first sun rolling element 210, either during manufacture of first sun rolling element 210 or during assembly. Furthermore, the coupling between first and second subelements 215, 216 of first sun rolling element 210 may be permanent or configured to allow for removal or replacement. Furthermore, the coupling may be accomplished via known mechanical, thermal or chemical means, including but not limited to, hardware such as screws, splines, or the like, welding, soldering, adhesive and epoxy.

First sun rolling element 210 is variably coupled via differential mechanism 220 to second sun rolling element 212. As power enters split sun assembly 201 via central axle 105, power is transferred to ball planet 130 via first sun rolling element 210 at point 210' and second sun rolling element 212 at point 212'. A variable coupling allows first sun rolling element 210 and second sun rolling element 212 to rotate at different speeds, allowing improved power capacity and efficiency of the variator with decreased slide or other negative effects on performance or components.

As depicted in FIG. 2A, ball planet axle 135 defines axis 132. Using various control systems and methods, ball planet axis 132 may be tilted at some angle γ (gamma) such that a first rolling radius (i.e., rps1) may be greater or less than a second rolling radius (i.e., rps2). U.S. Pat. Nos. 7,011,600 and 8,469,856 describe various methods for changing the tilt angle of a ball planet axis. The angle γ is defined as the angular displacement of axis 132 relative to line 133 defined parallel to axis 102. Accordingly, if power is being transferred from split sun assembly 201 to ball planet 130, embodiments may allow first sun rolling element 210 and second sun rolling element 212 to rotate at different speeds to apply the same torque to ball planet 130. Due to the different rolling radii rps1, rps2, the radius of ball planet 130, and gap 211 between contact points 215' and 212A', ball planet 130 will experience the same tangential force (although a variation in the tangential speed). Other factors including material properties, including the traction fluid parameters or the operating conditions of the variator (e.g., rotational speed of central axle 105, temperature or foaming of a traction fluid, a value of γ (gamma)), may result in a variation of tangential forces. Regardless, a first torque may be applied to ball planet 130 by first subelement 215 of first sun rolling element 210 at contact point 215' and an equal second torque may be applied to ball planet 130 by second sun rolling element 212 at contact point 212A'. Differential mechanism 220 ensures that the torque applied to ball planet 130 is distributed equally by first sun rolling element 210 and second sun rolling element 212. Thus, a more efficient and balanced transfer of power through variator 200 is possible.

In some embodiments, first sun rolling element 210 may include first subelement 215 coupled to shaft 105 and second subelement 216 coupled to first sun rolling subelement 215. Coupling or assembling second subelement 216 to first subelement 215 may be possible due to a non-permanent coupling such as complementary splines 226 on each subelement 215, 216 to allow for disassembly or adjustments, or may involve permanent coupling. Coupling of second subelement 216 to first subelement 215 may involve mechanical, chemical or thermal processes. Mechanical couplings may include permanent coupling, such as press fitting second subelement 216 onto first subelement 215. Coupling second subelement 216 to first subelement 215 may include hardware such as clip 229 or shim 228, or some other use of hardware. Other couplings may include screws, keyed features, welding, and the like.

Forming or assembling a differential mechanism may include selective positioning of second sun rolling element 212 relative to first sun rolling element 210. Second sun rolling element 212 may be positioned relative to first subelement 215 of first sun rolling element 210 such that gap 211 is formed.

Differential mechanism 220 may include carrier 225 containing first portion 225a, second portion 225b and third portion 225c. First portion 225a may be configured for retaining roller 213 between first sun rolling element 210 (including first subelement 215 of first sun rolling element 210) and second sun rolling element 212. Roller 213 may be a spherical roller as depicted in FIG. 2A or may be cylindrical, oval or some other shape based on a desired loading, the size and material used to manufacture first portion 225a, the shape or material used to form first and second subelements 215, 216 or second sun rolling element 212, or the like. Carrier 225 may further comprise second portion 225b having an axial length for spanning a desired axial distance. Carrier 225 may further include third portion 225c having a radial length. The axial and radial lengths of second portion 225b and third portion 225c may be selected to partially define an internal volume of differential mechanism 220. The internal volume may be determined based on a desired fluid capacity of differential mechanism 220, to allow additional component placement within differential mechanism 220, for ease of assembly, installation, removal or disassembly of differential mechanism 220, heat dissipation, or the like. In some embodiments, carrier 225 may include splines 224 or other feature to allow for assembly, disassembly, installation or removal of carrier 225 or components within carrier 225.

During assembly, first sun rolling element 210 may be positioned corresponding to a desired contact point 210' with ball planet 130. Assembly may include coupling first subelement 215 to shaft 105 and coupling second subelement 216 to first subelement 215. Assembly may further include positioning second sun rolling element 212 corresponding to a desired contact point 212A' with ball planet 130. Roller 213 is positioned between first sun rolling element 210 (including second subelement 216) and second sun rolling element 212. Assembly may also include ensuring that tangential forces at contact point 216' between roller 213 and second subelement 216 of first sun rolling element 210 are equal to tangential force at contact point 212B' between roller 213 and second sun rolling element 212. Clip 229 or shim 228 may position roller 213 in carrier 225 or a selected position (such as located evenly between first sun rolling subelement 216 and second sun rolling element 212. In some embodiments, the size or thickness of shim 228 or clip 229 may ensure gap 211 between first sun rolling element 210 and second sun rolling element 212 is maintained at a desired distance. In some embodiments, shim 228 or clip 229 may be manufactured from a desired material, shaped, or configured to provide a desired preload to maintain a desired contact between second sun rolling element 212 and ball planet 130, or to align first sun rolling element 210 (which may include second subelement 216) and second sun rolling element 212 relative to carrier 225. Assembly may include ensuring splines 226 on first subelement 215 are engaged with splines 226 on second subelement 216. Differential mechanism 220 or split sun assembly 201 may include needle bearings, lubrication ports, or other components, depending on an intended use or range of operation.

During operation, power may enter a variator via shaft 105 coupled to a differential mechanism. Power flowing through first sun rolling element 210 applies a first torque (via a tangential force at point 215') and first surface speed to ball planet 130. Power flowing through second sun rolling element 212 is transferred from shaft 105 via carrier 225 through roller 213 (and via a second surface speed) to ball planet 130 at point 212A'. Roller 213 allows relative motion between second subelement 216 and second sun rolling element 212, such that first sun rolling element 210 and second sun rolling element 212 is able to provide balanced power to ball planet 130, while allowing different surface speeds at contact points 210' and 212'. Embodiments may operate at any speed ratio within a range of speed ratios, including operating in lower speed ratios or higher speed ratios.

High torque ratio may refer to the situation in which power is output from ball planet 130 to a ring (not shown) when axis of rotation 132 for ball planet 130 is tilted at a negative γ (gamma) angle. The distance (rps2) between a contact point 210' corresponding to first sun rolling element 210 and axis of rotation 132 for ball planet 130 is less than the distance (rps1) between a contact point 212A' corresponding to second sun rolling element 212 and axis of rotation 132 for ball planet 130. As ball planet 130 rotates about axis 132, the torque transferred to ball planet 130 via contact point 210' is equal to the torque transferred to ball planet 130 via contact point 212A', even though the surface speed of ball planet 130 at contact point 210' may be greater than the surface speed of ball planet 130 observed at contact point 212A'.

Another situation occurs at low torque ratio, in which axis of rotation 132 for ball planet 130 is tilted at a positive γ (gamma) angle and power is output to the ring. The distance between contact point 210' corresponding to first sun rolling element 210 and axis of rotation 132 for ball planet 130 is greater than the distance between a contact point 212A' corresponding to second sun rolling element 212 and axis of rotation 132 for ball planet 130. As ball planet 130 rotates about axis 132, the torque transferred to ball planet 130 via contact point 210' is equal to the torque transferred to ball planet 130 via contact point 212A', even though the surface speed of ball planet 130 at contact point 210' may be less than the surface speed of ball planet 130 observed at contact point 212A'.

The ability for first sun rolling element 210 and second sun rolling element 212 to transfer balanced torque to ball planets 130 while allowing varying rotational speeds of the sun rolling elements may reduce sliding, spin, axial pull, or other unwanted effects on ball planets 130. When ball planet 130 experiences a uniform torque, then vibration, noise, fatigue, stress and damage (including damage to traction fluid) may be diminished, leading to a quieter or more stable system, or otherwise extending the life of the system.

In some embodiments, a differential mechanism may utilize gears such that torques transferred through first and second sun rolling elements of a split sun assembly are applied equally to multiple ball planets in a variator.

Figure 2B:
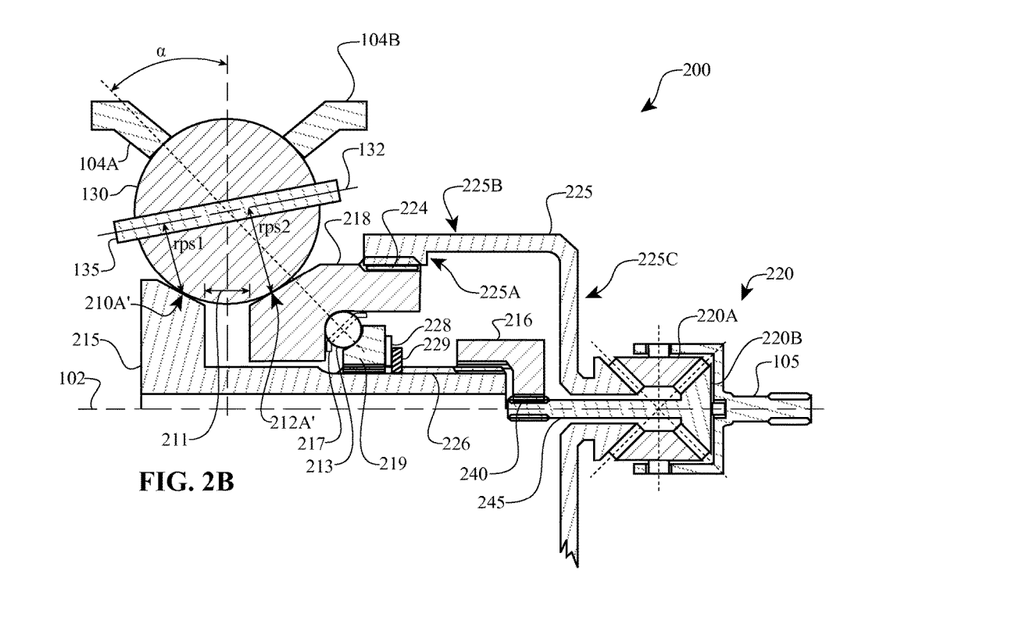
FIG. 2B depicts a close-up partial view of one embodiment of a variator including a split sun assembly and a differential mechanism, illustrating an offset configuration.

As depicted in the cross-sectional view of FIG. 2B, variator 200 may be coupled to a differential mechanism 220 formed with an offset. As used herein, the term "offset" may be used to describe a configuration in which torque differential elements are located axially outside of first sun rolling element 210 or second sun rolling element 212. As depicted in FIG. 2B, power may be received into a continuously variable transmission via shaft 105. Power may be transferred via shaft 105 to differential mechanism 220. Differential mechanism 220 may include bevel gears 220A and 220B. Power may be transferred via bevel gear 220B through axial member 245 to first subelement 215 of first sun rolling element 210 via second subelement 216 of first sun rolling element 210. Power may also be transferred via bevel gear 220A through carrier 225 through first subelement 218 of second sun rolling element 212. Roller 213 may be rotatable about axle 217 (which may form part of a carrier or other component not shown) to enable first subelement 218 of second sun rolling element 212 to rotate at a different speed than second subelement 219 of second sun rolling element 212.

In some embodiments, positioning a second sun rolling element may include positioning first subelement 218 of second sun rolling element 212 in contact with ball planet 130, positioning a plurality of rollers 213 on an opposite side of first 218, and positioning second subelement 219 of second sun rolling element 212 relative to first subelement 218. Positioning second subelement 219 of second sun rolling element 212 may include positioning clip 229, shim 228 or other hardware to support second subelement 219. In some embodiments, two or more of first subelement 218, second subelement 219, shim 228 or clip 229 may be formed integrally before assembly. In some embodiments, second subelement 219, shim 228, clip 229 or the like may be formed from a selected material, having a desired configuration or otherwise manufactured to provide a desired preload, maintaining first subelement 218 of second sun rolling element 212 in contact with ball planet 130.

Continuously variable transmissions having offset differential mechanisms may have various advantages. For example, a continuously variable transmission or variator with an offset differential mechanism may have a reduced radial profile, allowing for better placement of the continuously variable transmission or variator in particular situations, such as automobile engines in which volume may be limited. An offset differential mechanism may also allow for better lubrication or cooling of a variator, the differential mechanism or both. For example, in some embodiments, an offset differential mechanism may have an outer housing with fins or other increased surface area features to allow for better convective air flow and cooling. In some embodiments, an offset differential mechanism having an outer housing may further include lubrication ports, a water jacket, or some other forced cooling system. Embodiments may utilize the same fluids to lubricate or cool a split sun assembly, a variator, a differential, or some combination, or embodiments may lubricate or cool an offset differential mechanism independent of a variator. For example, some embodiments may include a first lubrication system for the differential mechanism and a second lubrication system for one or more other components, such as a sun assembly or a variator.

Figure 3A:
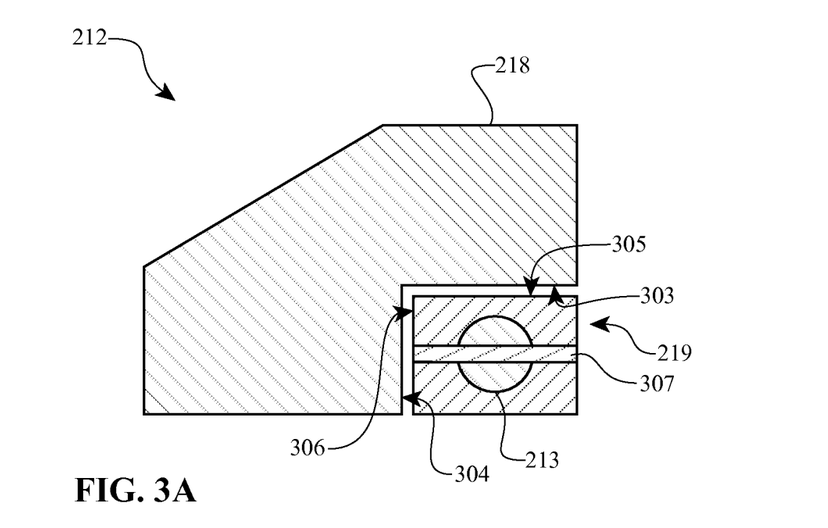
FIGS. 3A-3B depict cross-sectional partial views of embodiments of a system for counteracting axial forces in a split sun assembly.
Figure 3B:
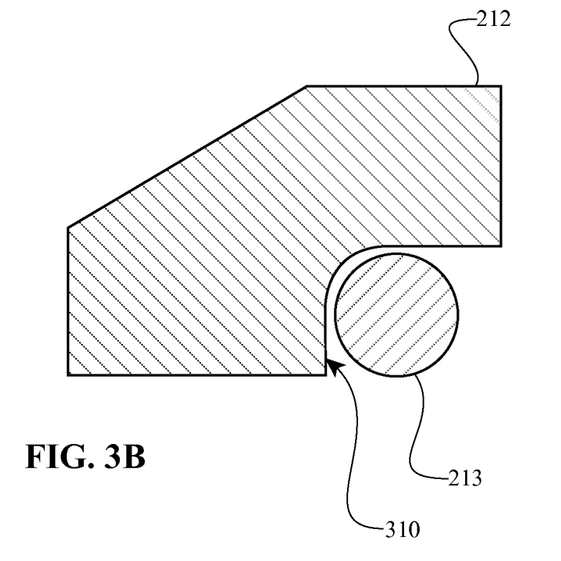

The construction of elements within a variator may vary. FIGS. 3A and 3B depict cross-sectional partial views of embodiments of a second sun rolling element, such as second sun rolling element 212 depicted in FIG. 2B.

As depicted in FIG. 3A, second sun rolling element 212 may be formed with angled sides for contact with a roller element in a carrier or other component. Sides 303 and 304 of first subelement 218 of second sun rolling element 212 may be machined or otherwise formed straight, with an angle between them. Second subelement 219 of second sun rolling element 212 may have sides 305 and 306 machined or otherwise formed having a complementary shape to first subelement 218. In this scenario, roller element 213 may be encased in second subelement 219. In some embodiments roller element 213 may have axle 307 passing through, which may reduce stress, enable easier assembly, or some other advantage. An advantage to the embodiment depicted in FIG. 3A may be the ability to use off the shelf parts, which may reduce production costs and allow components to be replaced easily.

As depicted in FIG. 3B, second sun rolling element 212 may be formed with surface 310 for contact with a roller element. Surface 310 may be formed as a curvilinear surface of constant or varying radius to provide a desired axial load. In some embodiments, roller element 213 depicted in FIG. 3B may be free floating or may be constrained angularly by a carrier (i.e., driven). An advantage to the embodiment depicted in FIG. 3B may be the ability to have a larger roller element 213 relative to second sun rolling element 212, which may increase the power capacity for a sun assembly.

A consideration for a split sun assembly may be that the axial forces exerted on first sun rolling element 210 and second sun rolling element 212 tend to spread the two components apart. An axial load balancing mechanism may be useful for limiting the separation between a first sun rolling mechanism and a second sun rolling mechanism.

Figure 4A:
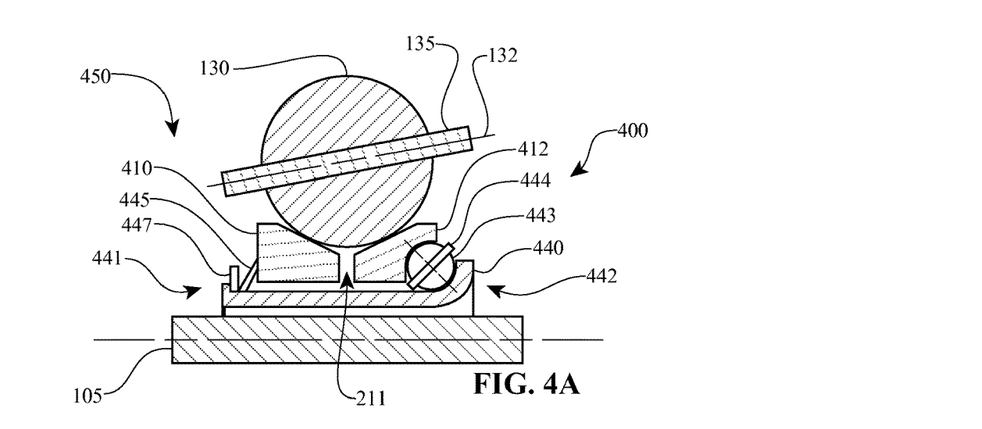
FIGS. 4A-4C depict cross-sectional partial views of embodiments of a variator including a split sun assembly with an axial force balancing mechanism.
Figure 4B:
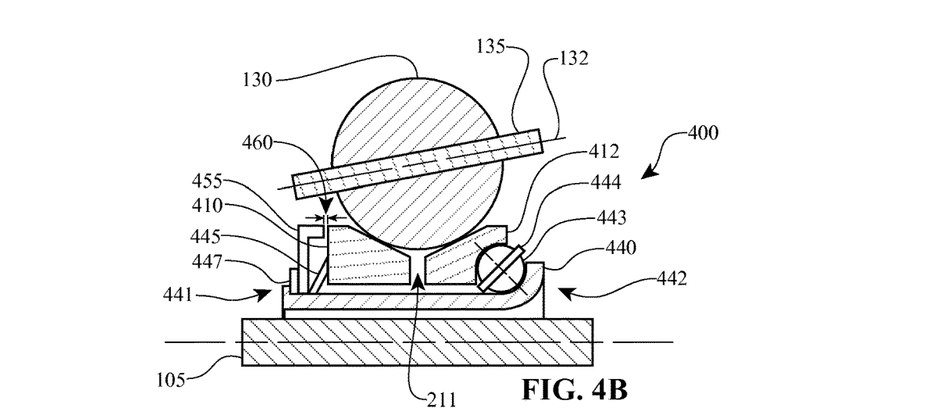
Figure 4C:
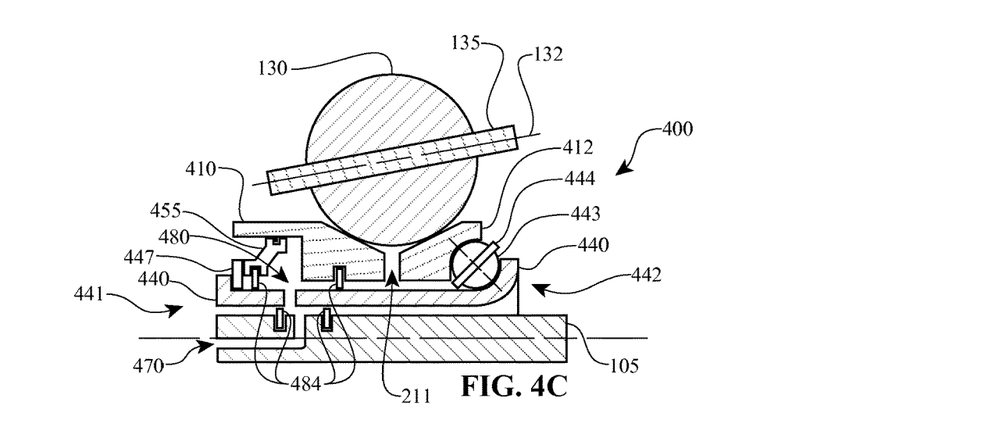

Embodiments of an axial load balancing mechanism may comprise a base with a preload element. FIGS. 4A-4C depict cross-sectional diagrams of embodiments of variators having split sun assemblies with axial load balancing mechanisms 400.

As depicted in FIG. 4A, ball planet 130 may contact first sun rolling element 410 and second sun rolling element 412. Base 440 of axial load balancing mechanism 400 may include a first end 441 configured to provide axial support for first sun rolling element 410, including applying a preload force. Applying an axial load may be accomplished by placement of resilient member 445 between first end 441 of base 440 and first sun rolling element 410. Resilient member 445 may be formed from a material having the ability to apply an axial force to first sun rolling element 410 based on tensile, compression, torsional, or bending stresses within resilient member 445. For example, resilient member 445 may be a spring washer, a torsion spring, or the like. During assembly, resilient member 445 may be positioned in axial load balancing mechanism 400. Resilient member 445 may be held in place permanently, or hardware 447, such as a clip, may be used to hold resilient member 445 in place but allow resilient member 445 to be removed. Base 440 may include second end 442 extending radially to provide axial support for second sun rolling element 412. Second end 442 may be permanent or may allow for disassembly as well. As depicted in FIG. 4A, second end 442 may have a curved inner surface for contact with spherical element 443 to reduce friction on second sun rolling element 412. Spherical elements 443 may be free floating or may be constrained such as by bearing cage 444.

A situation may occur with respect to axial loading when springs or other resilient mechanisms are used. If the dimensions of the spring are such that the spring characteristic curve has a linear shape, then the dimensions of the spring (and the dimensions of the assembly space in which the spring will used) must be held to very tight tolerances relative to the desired range of force. This situation is made worse if the spring rate is held high so the spring will reach the end of available motion in order to limit the portion of cam motion needed to flatten the spring and reserve adequate cam motion for the full range of expected torque. Disadvantages may include:

- Production tolerances are required to be small in order to limit the range of force supplied by the spring. Cost is increased by the tight tolerances.
- Production tolerances are further affected by the requirement to position the range of force in order to limit slippage.
- Available cam motion for the portion of operation above the upper limit of the disk spring is limited by the range of spring motion.
- Because the range of spring force is large, the median force must be increased to prevent slippage when the spring force is near or at the lower limit. This can negatively affect the efficiency and life of the transmission.

In some embodiments, a disc spring having a substantially flat portion of a force/deflection function may be used to provide a desired preload over a larger range of deflection and assembly tolerances.

Embodiments may overcome these deficiencies as well. As depicted in FIG. 4B, ball planet 130 may contact first sun rolling element 410 and second sun rolling element 412. Base 440 of axial load balancing mechanism 400 may include a first end 441 configured to provide axial support for first sun rolling element 410, including applying a preload force. Applying an axial load may be accomplished by placement of resilient member 445 capable of some deflection, and a rigid member 455 for limiting deflection. Resilient member 445 may be made from a first material having a desired resiliency or configured for resiliency. Rigid member 455 may be made from a second material or have a second configuration for limiting the separation between first sun rolling element 410 and second sun rolling element 412. Base 440 may include a second end 442 extending radially to provide axial support for second sun rolling element 412. Second end 442 may be permanent or may allow for disassembly as well. As depicted in FIG. 4B, second end 442 may have a curved inner surface for contact with spherical element 443 to reduce friction on second sun rolling element 412. Spherical elements 443 may be free floating or may be constrained such as by bearing cage 444. During operation, as axial forces on first sun rolling element 410 and second sun rolling element 412 increase, there is a tendency for the elements to separate. Initially, axial forces may be counteracted by resilient member 445, allowing first sun rolling element 410 to separate from second sun rolling element 412 by gap 460. Once the distance between first sun rolling element 410 and second sun rolling element 412 is equal to gap 460, at which point gap 211 exists between first sun rolling element 410 and second sun rolling element 412, axial forces are further reacted to by rigid member 455. Using this approach, embodiments may advantageously utilize a more flexible resilient member 445 to ensure contact between ball planet 130 and first and second sun rolling elements 410, 412, and ensure gap 211 between first and second sun rolling elements 410, 412 does not exceed a desired distance. Furthermore, embodiments may ensure that a mechanism or assembly of elements is configured to provide a force in an axial direction that is nonzero at a state of zero torque.

As depicted in FIG. 4C, ball planet 130 may contact first sun rolling element 410 and second sun rolling element 412. Base 440 of axial load balancing mechanism 400 may include a first end 441 configured to provide axial support for first sun rolling element 410. Applying an axial load may be accomplished by hydraulic pressure. Conduit 470 in shaft 105 allows a fluid to flow into or out of chamber 480 in first sun rolling element 410. Chamber 480 is formed from rigid member 455, base 440 and first sun rolling element 410. Seals 484 may be used to retain fluid in chamber 480 or conduit 470. Base 440 may include second end 442 extending radially to provide axial support for second sun rolling element 412. Second end 442 may be permanent or may allow for disassembly as well. As depicted in FIG. 4C, second end 442 may have a curved inner surface for contact with spherical element 443 to reduce friction on second sun rolling element 412. Spherical elements 443 may be free floating or may be constrained such as by bearing cage 444. In some embodiments, hydraulic pressure may be used in conjunction with a mechanical preload. A mechanical preload (such as a spring) may prevent slipping on startup or when hydraulic pressure is not available. During operation, fluid is pumped into or out of chamber 480 via conduit 470 to compensate for axial loading or to provide a desired gap 211 between first sun rolling element 410 and second sun rolling element 412.

Embodiments may also be directed to overcoming potential negative characteristics associated with traction-based assemblies. Namely, as surface speed increases in traction drive transmissions the available traction coefficient may decrease. A destructive slip may result. The slip may cause loss of power transmission, accelerated wear or some other unwanted performance.

Figure 5:
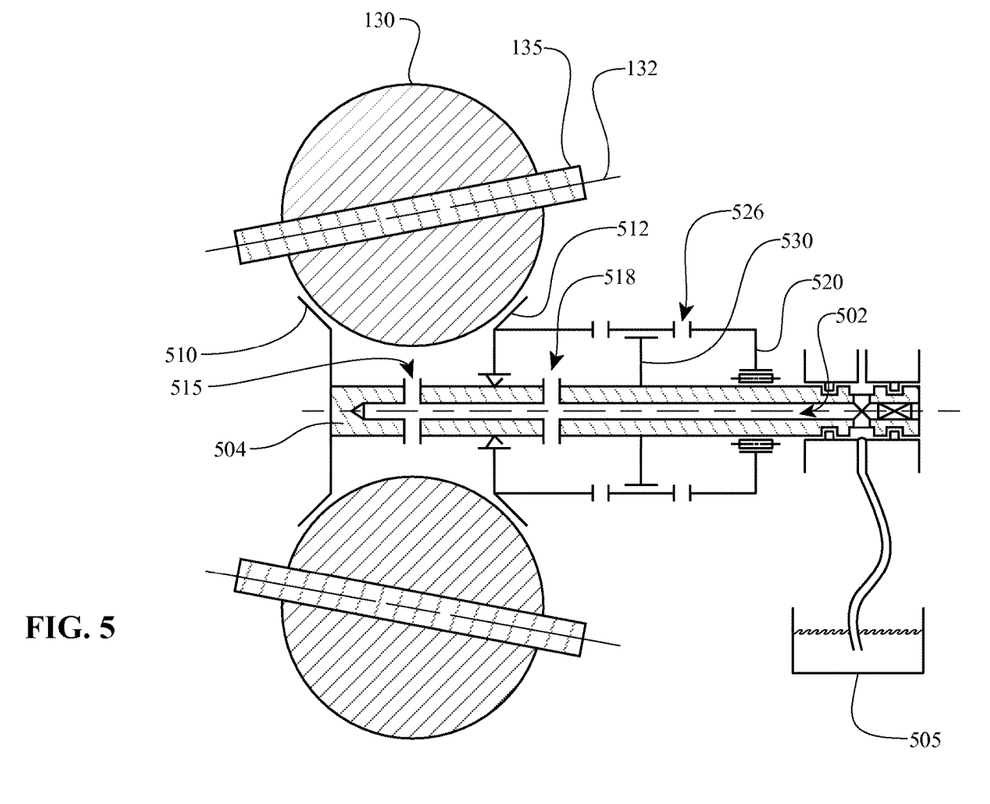
FIG. 5 depicts a cross-sectional partial view of a CVT having a split sun assembly with a self-adjusting axial force balancing mechanism.

FIG. 5 depicts a simplified diagram of one embodiment of a continuously variable transmission 500 having a split sun assembly. A hydraulic cylinder 520 and piston 530 are arranged in axial and rotational connection between first and second sun rolling elements 510, 512 of a split sun assembly. Fluid may be drawn from reservoir 505 and allowed to flow through conduit 502 in shaft 504 through inlets or openings 515, 518. Piston 530 is movable inside cylinder 520 in response to a change in fluid pressure in cylinder 520 such that an increase in the cylinder pressure results in an increase in the clamping force the two sun rolling elements 510, 512 apply to an array of planets 130. Cylinder 520 comprises an inlet 518 which may be fixed or variable in resistance to flow and which may be bidirectional, and an opening or outlet 526 which may be fixed or variable in resistance to flow and may be located near the inner radius or the outer periphery. As pressure increases, more fluid may be expelled through opening 526. In a preferred embodiment, opening 526 is smaller than inlet 515 or 518 such that rotation of the body of fluid within cylinder 520 causes a pressure differential which increases radially (i.e., the fluid pressure will increase as the radial position increases). This radial increase in fluid pressure may be referred to as centrifugal head. It should be noted that openings 515, 518 and 526 may be simple openings or may have a membrane, valve or other feature to control fluid pressure, fluid loss, etc.

An increase in the rate of rotation of the cylinder 520 will increase the centrifugal head and hence the clamping force the two sun rolling elements 510, 512 apply to an array of planets 130. In this way the negative effect speed has on the available traction coefficient is mitigated and may be fully compensated.

Variability of the resistance to flow of the inlet and outlet allow modulation of the compensation. Modulation of the compensation may be useful to further compensate for differences in the base fluid available traction fluid due to such factors as temperature or age.

Because the force between cylinder 520 and piston 530 is the result of the integration of pressure across the entire diameter of cylinder 520, the increase in force due to centrifugal head is added to the force from pressure applied at the center of cylinder 520. The rotating hydraulically actuated sun clamping device may be used to provide all or part of the required clamping force for the traction drive and simultaneously compensate for the effect of speed on traction.

Inlet 518 may simply connect cylinder 520 to a body of fluid such as reservoir or sump 505. In this case, if cylinder 520 is also provided with an opening or outlet 526 of appropriate restriction, then with rotation cylinder 520 will draw fluid from a source such as sump 505 to fill the available volume. If compliance allows piston 530 to move outward as the speed and clamping force increases, more fluid will be drawn in to cylinder 520 than escapes the outlet 526. When the speed and hence pressure decrease, fluid may exit both outlet 526 and inlet 518 to allow piston 530 to return toward its original position.

Figure 6:
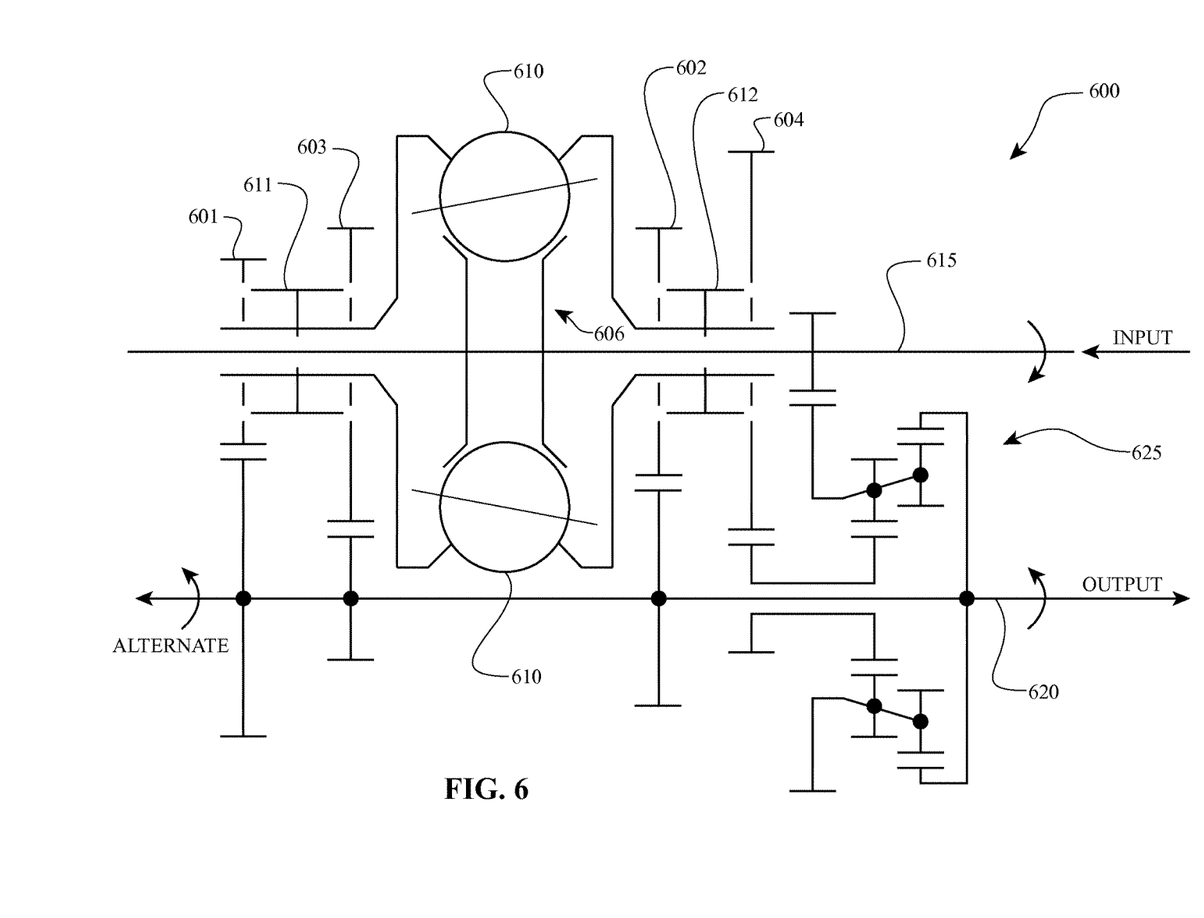
FIG. 6 depicts a schematic diagram, illustrating one embodiment of a drivetrain incorporating a ball planetary continuously variable transmission.

Embodiments may be used as independent transmissions, or may be incorporated into more complex drivetrains, subassemblies or the like. FIG. 6 depicts a schematic diagram, illustrating one embodiment of a drivetrain incorporating a ball planetary continuously variable transmission.

Drivetrain 600 may be operable as a four-mode transmission. For example, when clutch (or other engagement mechanism) 611 engages gear set 601 and clutch 612 is in a neutral position (i.e., not engaging either gear set 602 or 604), drivetrain 600 operates in a first mode having a first ratio. Power may pass through a continuously variable transmission (such as in via input shaft 615, through split sun 606 through planets 610 to gear set 601, then out through output shaft 620).

When clutch (or other engagement mechanism) 612 engages gear set 602 and clutch 611 is in a neutral position (i.e., not engaging either gear set 601 or 603), drivetrain 600 operates in a second mode having a second gear ratio. Power may pass through a continuously variable transmission (such as via input shaft 615, through split sun 606 through planets 610 to gear set 603, then out through output shaft 620).

When clutch (or other engagement mechanism) 611 engages gear set 603 and clutch 612 is in a neutral position (i.e., not engaging either gear set 602 or 604), drivetrain 600 operates in a third mode having a third gear ratio. Power may pass through a continuously variable transmission (such as via input shaft 615, through split sun 606 through planets 610 to gear set 602, then out through output shaft 620).

When clutch (or other engagement mechanism) 612 engages gear set 604 and clutch 611 is in a neutral position (i.e., not engaging either gear set 601 or 603), drivetrain 600 operates in a fourth mode. As depicted in FIG. 6, the fourth mode may include a split power path. A portion of the power may pass through a continuously variable transmission (such as via input shaft 615, through split sun 606 through planets 610 to gear set 604). Another portion of the power may split into a portion transmitting on output shaft 620 and a portion transmitting through planetary gear set 625 (depicted in FIG. 6 as a compound planetary gear set. The two power paths may combine downstream and the combined power path may have a greater efficiency. This mode may be beneficial at cruising speeds or other situations in which the output power remains relatively constant.

Drivetrain 600 may operate over a range of speed ratios. For example, drivetrain 600 may be able to achieve a ratio range of approximately 5:1 to approximately 0.4:1.

Input power may be received from an engine or motor (not shown). Power paths may be controlled by various shift collars. Shift collars may be synchronized, may be clutches, and may be manual or hydraulic.

Figure 7:
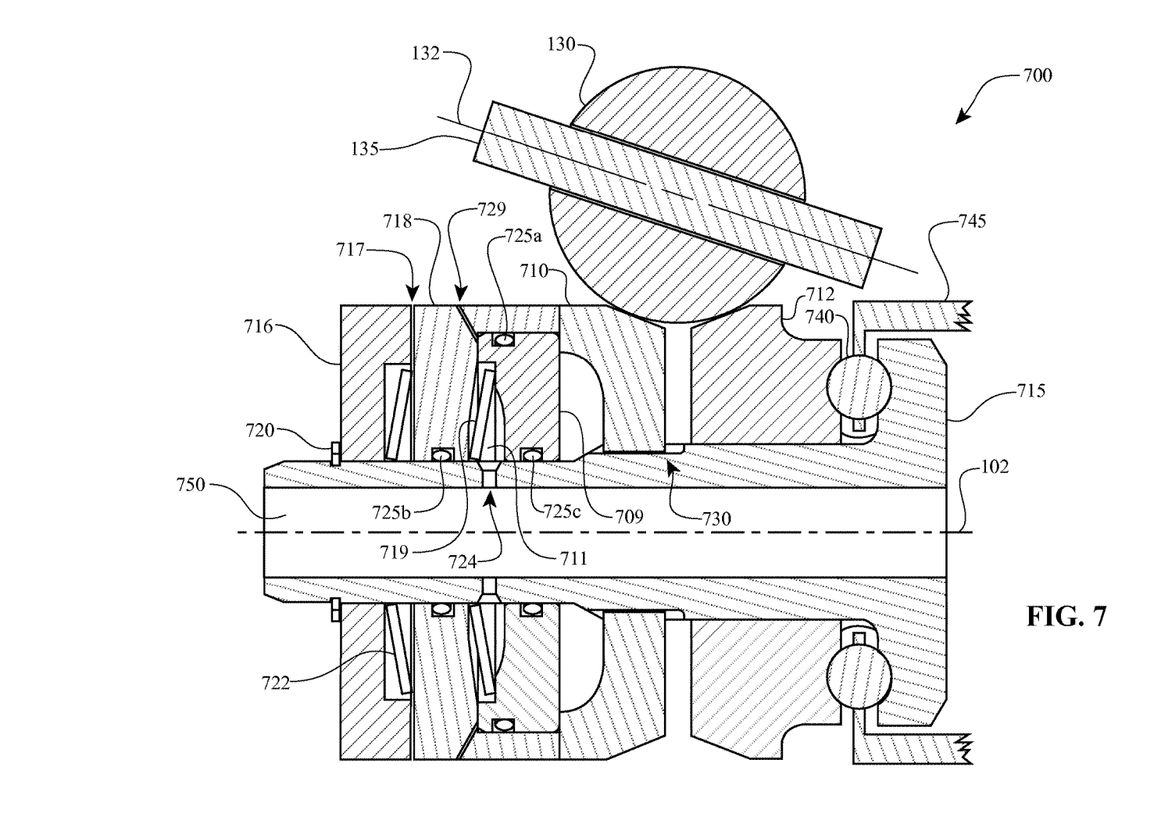
FIG. 7 depicts a cross-sectional partial view of one embodiment of a variator including an adjustable split sun assembly.

Certain environments or applications may take advantage of an adjustable split sun assembly. FIG. 7 depicts a cross-sectional partial view of one embodiment of a variator having a split sun assembly, and in which mechanical or fluid forces may be generated to counteract the tendency for first and second sun rolling elements to separate. Power may enter variator 700 via drive assembly 745, where it is transmitted to first sun rolling element 710 by way of central shaft 715 and to second sun rolling element 712. In some embodiments central shaft 715 may have splines 730, which may allow for ease of assembly of variator 700. First sun rolling element 710 and second sun rolling element may rotate at different speeds due to ball planet 740. Power transmitted through first sun rolling element 710 and second sun rolling element 712 may rotate planet 130 about axle 135 defining axis of rotation 132. Spin and other unwanted effects are reduced or avoided because first sun rolling element 710 and second sun rolling element 712 are not constrained relative to each other.

As rotational speed of variator 700 increases, first sun rolling element 710 and second sun rolling element 712 may be biased away from each other. To counteract this possibility, a system may be implemented to apply increasing force relative to speed. Embodiments may use mechanical devices, hydraulic systems, or some combination to provide increasing forces.

Mechanical systems may include thrust washer 716 or 718 or both, in combination with resilient member 719, 722 or both, and piston 709. In the setup shown in FIG. 7, first sun rolling element 710 is in contact with piston 709. If first sun rolling element 710 begins to translate axially away from second sun rolling element 712, resilient member 719 (and possibly seals 725) may provide resistance. In some embodiments having two thrust washers 716, 718 of different spring constants or other resiliency parameters, if first sun rolling element 710 translates axially away from second sun rolling element 712, resistance may be first provided by resilient member 719 resisting movement of piston 709 relative to thrust washer 718 before resilient member 722 provides any substantial force generation. If first sun rolling element 710 continues to translate axially away from second sun rolling element 712, thrust washer 718 may also be forced to translate axially away from second sun rolling element 712, which resilient member 722 counteracts as long as gap 717 exists between thrust washers 716, 718. If the resistance provided by resilient member 722 is overcome, first sun rolling element 710 continues to translate axially away from second sun rolling element 712 until thrust washer 718 contacts thrust washer 716 (i.e., gap 717 does not exist) and further axial translation is prevented by clip or other rigid member 720. This mechanical system may be referred to as a serial system, in that resilient member 719 resists axial movement of piston 709 first, then resilient member 722 resists axial movement of piston 709 and thrust washer 718, then rigid member 720 resists movement of piston 709, thrust washer 718 and thrust washer 716.

One embodiment of a hydraulic system which may work in parallel or series with a mechanical force generation system is also depicted in FIG. 7.

Chamber 711 may be formed in the volume defined by piston 709, central shaft 715 and thrust washer 718. Seals 725a, 725b and 725c may prevent fluid from escaping chamber 711 except via bleed passage 729. Oil or other fluid may enter passage 750 and enter chamber 711 via passage 724. An increase in fluid pressure in chamber 711 will bias first sun rolling element 710 axially toward second sun rolling element 712, whereas a decrease in fluid pressure in chamber 711 will allow first sun rolling element 710 to translate axially away from second sun rolling element 712. Hydraulic pressure may be used in parallel with mechanical resistance. For example, if chamber 711 contains resilient member 719, then resistance to first sun rolling element 710 may come from both hydraulic pressure and resilient member 719. If resilient member 719 is not contained within chamber 711 but thrust washer 716 and resilient member 722 are used, then fluid resistance may be used in series with the mechanical system. Those skilled in the art will appreciate that a fluid axial force generation system and a mechanical axial force generation system may be combined in various ways such that fluid force is generated either in parallel or series with mechanical force generation. Furthermore, embodiments may be configured such that a fluid force generation system is the primary force generation system or the mechanical force generation system is the primary force generation system.

Other embodiments and variations are possible. For example, in some embodiments, a first bearing race may be rotationally and axially coupled to the first sun rolling element or a second bearing race may be integral to the second sun rolling element, and assemblies may include an inner bearing race or a bearing element spacer with an axis of rotation coincident to the first center axis. Each bearing element may have a y-z bearing plane containing a center of the bearing element normal to the first central axis. In some embodiments, outer contact between a bearing rolling element and a second bearing race occurs at a radial distance from the first center axis greater than the radial distance from the first center axis to the center of the bearing rolling element. In some embodiments, outer contact between a bearing element and a first bearing race occurs at a radial distance from the first center axis greater than the radial distance from the first center axis to the center of the bearing rolling element. In some embodiments, the outer contact between the bearing rolling element and the first bearing race occurs at the same radial distance from the first center axis as the outer contact between the bearing rolling element and the second bearing race. In some embodiments, outer contact between a bearing rolling element and a first bearing race is on an opposite side of the y-z bearing plane from the outer contact between the bearing rolling element and the second bearing race. In some embodiments, inner contact between a bearing rolling element and an inner bearing race is in the y-z plane at the closest approach of the bearing rolling element to the first center axis. In some embodiments, an inner bearing race is rotationally coupled to a power source or load. In some embodiments, an angle of contact at each outer bearing contact is designed by use of known calculations to provide proper a proper ratio of normal force to transmitted force to support traction.

Embodiments disclosed herein have been described as they pertain to ball planetary type continuously variable transmissions. Furthermore, embodiments have been depicted with power entering through a shaft. However, those skilled in the art will appreciate that concepts and features described herein may be applicable to other settings, including power entering through a ring or some combination of rings and a shaft. Furthermore, embodiments disclosed herein may be used individually or in combination with other embodiments to provide a drive train, continuously variable transmission, variator or the like with a balanced split sun. Those skilled in the art will appreciate that these concepts may be equally useful in other settings and are thus not to be limited.

What is claimed is:

1. A variator, comprising:
a central axle defining a longitudinal axis;
an array of ball planets rotatable about the longitudinal axis;
a first ring in contact with the array of ball planets and orbital about the longitudinal axis, the first ring being on a first side of the array of ball planets;
a second ring in contact with the array of ball planets and orbital about the longitudinal axis, the second ring being on a second side of the array of ball planets;
a first sun rolling element with a first axis coincident with the longitudinal axis, the first sun rolling element shaped for contact with the array of ball planets;
a second sun rolling element with a second axis coincident with the longitudinal axis, the second sun rolling element shaped for contact with the array of ball planets; and
a torque differential mechanism coupled to the central axle and coupled to each of the first sun rolling element and the second sun rolling element,
wherein power is transferred from the central axle to the torque differential mechanism,
wherein the torque differential mechanism transfers a first torque to the first sun rolling element and a second torque to the second sun rolling element, and
wherein each of the first sun rolling element and the second sun rolling element transfer power to the plurality of ball planets.

2. The variator of claim 1, wherein the torque differential mechanism comprises a plurality of rollers interposed between the first sun rolling element and the second sun rolling element.

3. The variator of claim 2, wherein the torque differential mechanism is offset axially from the first and second sun rolling elements.

4. The variator of claim 2, wherein the torque differential comprises
a first portion configured to retain the rollers
a second portion extending axially and having an axial length; and
a third portion extending radially and having a radial length, wherein the first portion, the second portion, the third portion, and the central axle define a volume having a fluid capacity.

5. The variator of claim 1, wherein the differential mechanism comprises a bevel gear mechanism coupled to the central axle, wherein a first bevel gear is coupled to the first sun rolling element and a second bevel gear is coupled to the second sun rolling element.

6. A drivetrain comprising:
a variator comprising:
a central axle coupled to a power source;
an array of ball planets orbital about the central axle, the central axle defining a longitudinal axis;

a first ring in contact with the array of ball planets and rotatable about the longitudinal axis, the first ring being on a first side of the array of ball planets;

a second ring in contact with the array of ball planets and rotatable about the longitudinal axis, the second ring being on a second side of the array of ball planets;

a first sun rolling element rotatable about the central axle, the first sun rolling element shaped for contact with the array of ball planets;

a second sun rolling element with an axis coincident to the central axle, the second sun rolling element shaped for contact with the array of ball planets; and a torque differential mechanism coupled to each of the first sun rolling element and the second sun rolling element, wherein power is transferred from the central axle to the torque differential mechanism, wherein the torque differential mechanism transfers a first torque to the first sun rolling element and a second torque to the second sun rolling element, wherein each of the first sun rolling element and the second sun rolling element transfer torque to the plurality of ball planets.

7. The drivetrain of claim 6, wherein the variator is coupled to the power source via a shaft extending through the variator, wherein torque transferred from the first sun rolling element is equal to torque transferred from the second sun rolling element.

8. The drivetrain of claim 6, wherein the variator is coupled to a power load via one of the first or second rings.

* * * * *